UNITED STATES PATENT OFFICE.

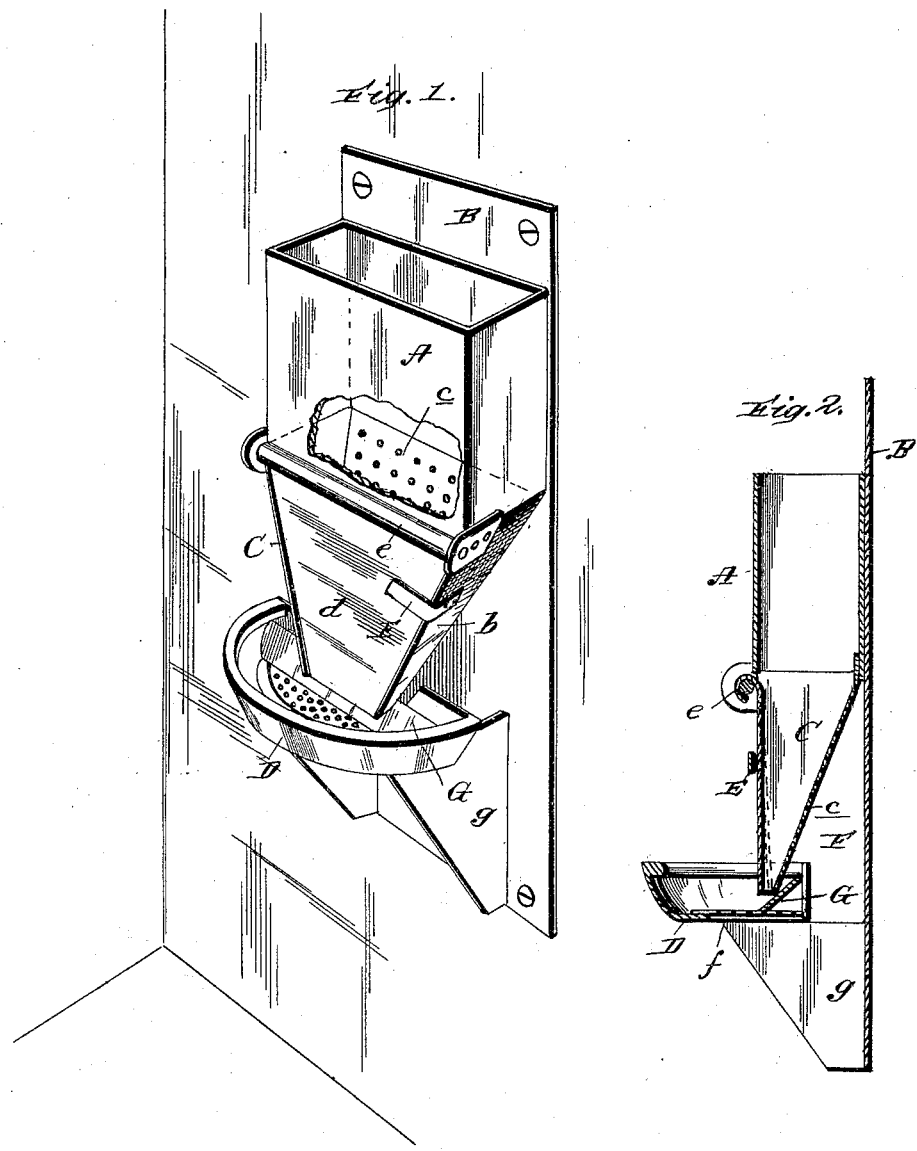

AARON WRIGHT, OF HUDSON, NEW YORK.

FEED-TROUGH.

SPECIFICATION forming part of Letters Patent No. 434,856, dated August 19, 1890.

Application filed April 19, 1890. Serial No. 348,619. (No model.)

*To all whom it may concern:*

Be it known that I, AARON WRIGHT, a citizen of the United States, residing at Hudson, in the county of Columbia and State of New York, have invented certain new and useful Improvements in Feed-Troughs; and I do declare the following to be a full, clear, and exact description of the invention, such as will enable others skilled in the art to which it appertains to make and use the same.

This invention has relation to feed-boxes; and it has for its object to provide a feed box or trough for horses in which oats and other feed will be subjected to the action of a series of screens or sieves, and to provide means whereby the discharge of the feed into the trough or manger may be regulated automatically and by the animal feeding.

The invention will be fully understood from the following description and claims, when taken in connection with the annexed drawings, in which—

Figure 1 is a perspective view of my improved device with the front wall of the main receptacle partly broken away to expose the rear inclined sieve, and Fig. 2 is a vertical central sectional view of the same.

Referring by letter to said drawings, A indicates the grain-holder or feed-box, which is preferably of a rectangular form in cross-section, although it may be of any suitable shape, and B indicates a plate for attaching the whole device to a wall or other means of support. This plate may have holes in its corners to receive screws or other fastening devices.

C indicates a chute for conveying the grain or feed from the bottomless box or holder A to the trough or manger D below. This chute or conveyer has tapering or inclined side walls *b* and a rear forwardly-inclined wall or screen *c*, which co-operates with the end walls and a front hinged wall or valve *d* in presenting a reduced opening or discharge into the trough or manger. The front wall *d* is hinged at its upper end to the outer lower end of the box or holder, as shown at *e*, and assumes an approximately vertical position between the lateral or side walls of the chute, so as to have a limited outward movement therein.

E indicates a stop for the hinged front wall of the feed-box. This stop is secured to one of the side walls *b* and arranged so as to limit the outward movement of the valve or wall *d*.

The trough or manger D is preferably of a semicircular form, although it may be of other suitable shape. This trough or manger is provided with a screen or perforated bottom *f*, and is supported on brackets *g*, which are secured to the plate B.

It will be observed that the trough or manger is arranged upon the brackets *g* in such position as to form an interspace between the inner end of the same and the securing or attaching plate B. By this construction dust and other impurities passing from the grain through the screen *c* will fall to the ground or floor without entering the trough or manger, while the grain that passes to the manger through the spout or conveyer will be given another and final screening through the screen *f*, so that the grain fed to the animal may be clean and free from dust, grit, and dirt.

The rear of the trough is preferably provided with an inclined wall G, which passes slightly beneath the discharge of the spout or conveyer C and serves both as a deflector and also assists in closing the discharge-opening of the conveyer when the lower end of the front wall or valve has been pushed in by the animal in feeding.

Having described my invention, what I claim is—

1. The combination, with the attaching-plate B, of the feed-box A secured thereto, the tapering conveyer leading from the bottom of the feed-box, and having a rear inclined perforated wall adapted to sieve the feed and discharge impurities outside of the trough or manger, and also having a front wall hinged at its upper end and provided with a stop, whereby the feed may be fed in automatically-regulated quantities to the manger, and the manger supported on brackets away from the securing-plate, substantially as specified.

2. The combination, with the attaching-plate, of the brackets secured thereto, the feed-box also secured to said brackets, the converging or tapering conveyer leading from the feed-box to the trough, and having a rear perforated wall across the interspace between the trough and plate, the front hinged wall and a stop for same, and the trough having a deflector and a perforated bottom, substantially as specified.

In testimony whereof I affix my signature in presence of two witnesses.

AARON WRIGHT.

Witnesses:
HORACE R. PECK,
A. W. CHAPIN.